United States Patent
Gambier et al.

(10) Patent No.: US 11,530,666 B2
(45) Date of Patent: Dec. 20, 2022

(54) METHOD FOR CONTROLLING AN INJECTOR IN A COMMON RAIL SYSTEM

(71) Applicant: VITESCO TECHNOLOGIES GMBH, Hanover (DE)

(72) Inventors: Edouard Gambier, Toulouse (FR); Johann Ratinaud, Toulouse (FR); Quentin Dussardier, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 0 days.

(21) Appl. No.: 17/311,489

(22) PCT Filed: Dec. 10, 2019

(86) PCT No.: PCT/EP2019/084329
§ 371 (c)(1),
(2) Date: Jun. 7, 2021

(87) PCT Pub. No.: WO2020/120435
PCT Pub. Date: Jun. 18, 2020

(65) Prior Publication Data
US 2022/0018304 A1    Jan. 20, 2022

(30) Foreign Application Priority Data

Dec. 10, 2018    (FR) ...................... 1872568

(51) Int. Cl.
*F02D 41/38*    (2006.01)
(52) U.S. Cl.
CPC .. *F02D 41/3836* (2013.01); *F02D 2200/0602* (2013.01); *F02D 2200/0614* (2013.01)

(58) Field of Classification Search
CPC .. F02D 41/38; F02D 41/3836; F02D 41/3845; F02D 41/2467; F02D 41/24;
(Continued)

(56) References Cited

U.S. PATENT DOCUMENTS

| 10,378,474 | B2 | 8/2019 | Hirchenhein et al. |
| 10,533,514 | B2 * | 1/2020 | Garimella ............. F02D 35/023 |

(Continued)

FOREIGN PATENT DOCUMENTS

| DE | 10 2015 212154 | 1/2017 |
| DE | 10 2015 214 817 A1 | 2/2017 |

(Continued)

OTHER PUBLICATIONS

International Search Report and Written Opinion of the ISA for PCT/EP2019/084329, dated Mar. 11, 2020, 15 pages.

*Primary Examiner* — Logan M Kraft
*Assistant Examiner* — Johnny H Hoang
(74) *Attorney, Agent, or Firm* — Nixon & Vanderhye

(57) ABSTRACT

The invention relates to a method for controlling an injector in a common rail system, comprising the following steps: detecting (E2) an increase between an observed static flow rate and a reference static flow rate and determining (E3) a corrected rail-pressure setpoint (Pcor) guaranteeing the same quantity of fluid injected with the observed static flow rate as that injected with a reference pressure (Pref) and the reference static flow rate.
The invention thus advantageously makes it possible to maintain the same duration of injection.

13 Claims, 3 Drawing Sheets

(58) Field of Classification Search
CPC .................. F02D 41/40; F02D 41/401; F02D 2200/0602; F02D 2200/0614
See application file for complete search history.

(56) References Cited

U.S. PATENT DOCUMENTS

| | | | |
|---|---|---|---|
| 10,578,043 B2 | 3/2020 | Hirchenhein et al. | |
| 10,598,116 B2 | 3/2020 | Hirchenhein et al. | |
| 2014/0251275 A1* | 9/2014 | Lana .................. | F02D 41/0085 123/452 |
| 2018/0106208 A1* | 4/2018 | Hirchenhein ....... | F02D 41/2467 |
| 2019/0145313 A1* | 5/2019 | Hirchenhein ....... | F02D 41/2467 701/102 |
| 2019/0211763 A1* | 7/2019 | Hosaka .................. | F02D 45/00 |

FOREIGN PATENT DOCUMENTS

| | | |
|---|---|---|
| DE | 10 2015 214815 | 2/2017 |
| DE | 10 2016 211 551 A1 | 12/2017 |
| DE | 10 2016 214464 | 2/2018 |
| DE | 10 2018 104035 | 9/2018 |
| WO | 2016/155986 A1 | 10/2016 |
| WO | 2017/218211 | 12/2017 |

* cited by examiner

METHOD FOR CONTROLLING AN INJECTOR IN A COMMON RAIL SYSTEM

BACKGROUND OF THE INVENTION

Field of the Invention

The present invention generally relates to the field of engine management and is aimed in particular at a method for controlling an injector in a common rail system making it possible to correct an increase in the static flow rate of said injector.

Description of the Related Art

It is known practice to employ an injector in order to inject a fluid into a cylinder of a combustion engine. In a common rail system, said common rail constitutes a reserve of fluid under a known pressure and situated upstream of at least one injector. An injector therefore acts as a valve that can be made to transition between an open position and a closed position. Controlling an injector to occupy an open position for a given duration determines a quantity of fluid injected, provided that the difference in pressure between the common rail and the cylinder into which the injection is performed, and the working cross section or passage cross section of the injector, are known.

It is thus possible to establish, theoretically or empirically, for a given common-rail pressure, a function or a table that indicates the duration for which an injector is opened in order to inject a given quantity of fluid.

The fluid characteristics which may play a part, such as the viscosity, can be eliminated because, for a given engine, the fluid concerned is always the same fluid.

In the known way, a common rail injection system comprises a chamber (or rail), and a hydraulic pump that is feedback-controlled in such a way in order to manage the pressure of fluid in said chamber. The chamber is common to all the cylinders of the internal combustion engine. The feedback-control is sequenced in such a way as to ensure that, for each cylinder into which injection is desired, the following events take place: measuring the mean rail pressure in a calculation step, where both delivery via the hydraulic pump and injection are performed wholly during said calculation step.

The system is able, in a feedback-controlled manner, to regulate the hydraulic duration of injection as a function of a given quantity or mass to be injected and as a function of the pressure in the common rail, by means of a detection device that detects the opening and closing of each individual injector.

The pressure in the common rail is known because it is the subject of feedback-control that keeps it at a given setpoint pressure. The pressure in the common rail can also be measured by a sensor. The static flow rate is defined by the flow rate passing through an injector that is open to the maximum extent. The static flow rate is dependent on the passage cross section of the injector and on the difference in pressure between the upstream side (common rail) and downstream side (cylinder) of the injector. The static flow rate is, to a first approximation, considered to be constant and can be identified theoretically or empirically for a given injector as a function of the variation in pressure.

A problem arises when this static flow rate changes. Such change may be associated, for example, with corrosion or wearing of the injector, leading to an increase in the static flow rate. If the controlling of the injector is not changed, a detrimental increase in the quantity of fluid injected can occur.

A known flow sensor or method, for example, from DE 102016214464, DE 102016211551 or DE 102015214817, may be used to detect an increase in the static flow rate. It is even possible to determine a static flow rate ratio, relative to a reference static flow rate, typically the static flow rate of the injector when new.

Conventionally, the prior art corrects an increase in static flow rate by modifying the time for which the injector is open, so as to keep the quantity of fluid injected identical.

This correction approach presents problems insofar as it modifies the rate of introduction or the instantaneous flow rate relative to that initially desired by the engine management. FIG. 1 compares, for a constant quantity of fluid injected, on a diagram featuring the instantaneous flow rate of an injector on the ordinate axis as a function of time on the abscissa axis, a profile P0 corresponding to a nominal static flow rate, a profile P2 corresponding to a reduced static flow rate and a profile P1 corresponding to an increased static flow rate. It may be seen that where the injection profile is modified such that the duration increases, the static flow rate is reduced.

A modification to the profile, particularly where the static flow rate increases, may lead to dilation: namely the introduction of fuel into the engine lube oil, potentially leading to damage to the engine. A modification to the profile may also give rise to excessive cylinder pressures which may lead to damage to the engine or to pollutant emissions.

SUMMARY OF THE INVENTION

The objective of the invention is to perform a correction on the static flow rate using an alternative principle to correcting the duration of injection.

This objective is achieved by virtue of a method for controlling an injector in a common rail system, comprising the following steps: detecting an increase between an observed static flow rate and a reference static flow rate, and determining a corrected rail pressure that guarantees injection of the same quantity of fluid with the observed static flow rate as that which is injected with a reference pressure and the reference static flow rate.

According to another feature, the corrected rail pressure is determined experimentally from a characteristic static flow rate as a function of rail pressure, by adding to the reference pressure the difference between a pressure that there ought to be for the observed static flow rate, and the reference pressure.

According to another feature, the corrected rail pressure is determined theoretically using the Bernoulli equation, according to the formula $$Pcor = \frac{\rho(Pref, T) \cdot (Pref - Pcyl)}{\rho(Pcor, T) \cdot R^2} + Pcyl$$

where Pcor is the corrected rail pressure, p is the density of the injected fluid, Pref is the reference pressure, T is the temperature of the injected fluid, Pcyl is the pressure in the cylinder and R is the ratio of the observed static flow rate to the reference static flow rate.

According to another feature, the method further comprises a step of saturating the corrected rail pressure with a lower threshold.

According to another feature, the duration of injection or the mass of fluid injected remains the same.

BRIEF DESCRIPTION OF THE DRAWINGS

The invention will be better understood upon reading the following description, given solely by way of example, and with reference to the appended drawings, in which.

DESCRIPTION OF THE PREFERRED EMBODIMENTS

When an increase in the static flow rate is detected for an injector, rather than modifying the duration of injection Tref in order to compensate, with the above-mentioned disadvantages, the principle of the invention is to modify the injection pressure, whenever it is possible to do so.

Figure 1:
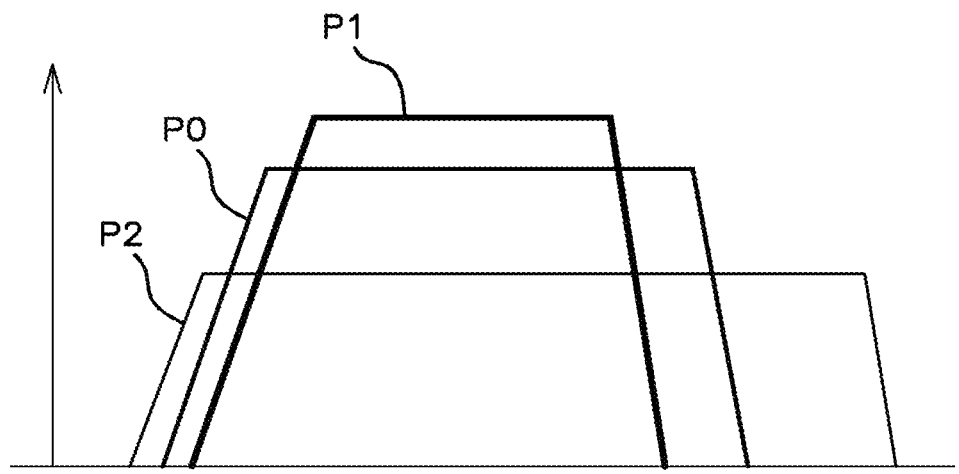
FIG. 1 already described, compares various injection profiles.
Figure 2:
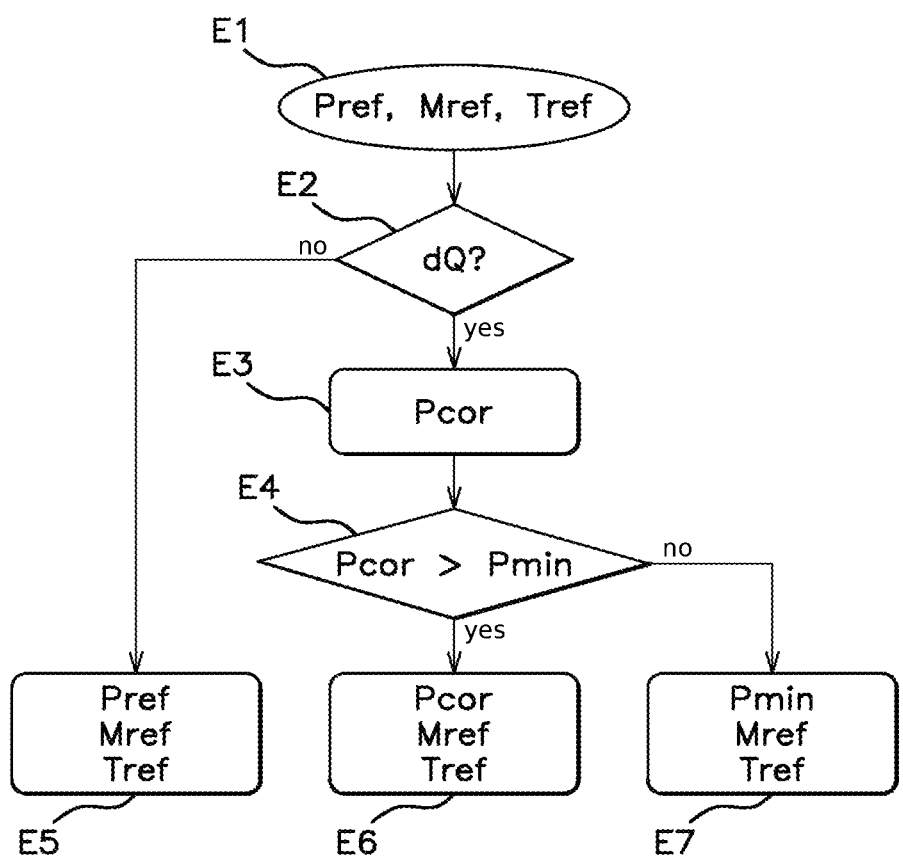
FIG. 2 depicts a flow chart of the invention.

In order to do that, with reference to FIG. 2, a method for controlling an injector in a common rail system according to the invention comprises the following steps. A first step E2 tests for the presence of an increase between an observed static flow rate Qobs and a reference static flow rate Qref. The reference static flow rate Qref is the initial flow rate of the injector when new. The observed static flow rate Qobs is that observed at the instant at which the method is executed. It may be measured by a flow sensor or else be determined by any method, such as one of the methods proposed by one of the three prior art documents mentioned above. During the course of this step, a ratio R between the observed static flow rate Qobs and the reference static flow rate Qref is also determined.

If no increase in the static flow rate is present, the invention changes nothing. The test T2 is followed by the step E5, which corresponds to its "no" branch. The reference pressure Pref and reference mass Mref parameters, determined by the engine management during a prior step E1, are used in step E5, on the one hand, to control the common rail pressure, the reference pressure Pref being transmitted as setpoint to a feedback controller tasked with regulating the pressure in the common rail and, on the other hand, to determine a duration of injection, which is a function of the reference mass Mref and of the reference pressure Pref, and to command an injection by opening the injector for said open duration Tref.

By contrast, if an increase in the static flow rate is detected during the test E2, the next part of the method follows the "yes" branch and continues at step E3. This step determines a corrected rail-pressure setpoint Pcor such that it corrects the increase in static flow rate. To do that, the corrected pressure Pcor is a new pressure setpoint value determined such that the same quantity of fluid is injected with the observed static flow rate Qobs as would have been injected with the reference pressure Pref and the reference static flow rate Qref.

As shown in step E6, this corrected pressure Pcor is used, in place of the reference pressure Pref, as the setpoint for the feedback-control of the common rail pressure.

It may be noted here that the reference mass Mref defining the mass of fluid to be injected and the reference pressure Pref are maintained in order to determine an injection duration Tref and manage the opening of the injector for this injection duration Tref. Specifically, the pressure correction, which determines the corrected pressure Pcor, makes a correction to the static flow rate. The corrected pressure Pcor is such that an injection using the Pcor, Qobs pair, injects the same quantity of fluid as an injection using the Pref, Qref pair. Hence, because the static flow rate is corrected by the corrected pressure Pcor, it is appropriate to use the same reference mass Mref and the same reference pressure Pref as setpoint for determining an injection duration Tref identical to that which would have been needed with Pref, Qref. Thus, advantageously, the invention contrives for the injection profile to remain the same.

Any method can be used for determining the corrected pressure Pcor in step E3. Two illustrative methods are indicated hereinbelow.

Figure 3:
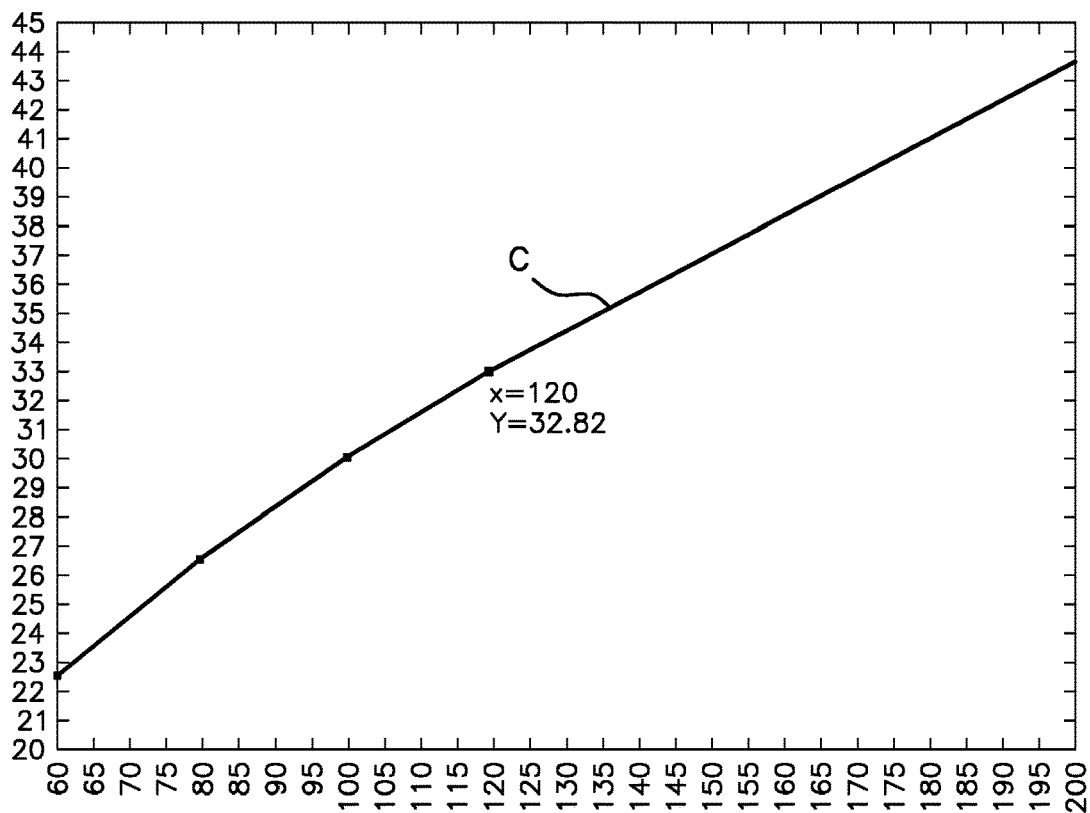
FIG. 3 depicts a characteristic 4 featuring the static flow rate on the ordinate axis as a function of the common rail pressure on the abscissa axis.

According to an experimental first method, the corrected pressure Pcor is determined experimentally from a characteristic C of static flow rate as a function of rail pressure. Such a characteristic C is illustrated in FIG. 3 and features the static flow rate on the ordinate axis as a function of the common rail pressure on the abscissa axis. This characteristic C is used to determine a difference between a pressure Pobs that there ought to be for the observed static flow rate Qobs, and the reference pressure Pref. This difference in pressure is then added to the reference pressure Pref to obtain the corrected pressure Pcor.

Thus, for example, if instead of a reference static flow rate Qref of 32.82 mg/ms, what is observed is an increased observed static flow rate Qobs of 35 mg/ms, the characteristic C is read in order to determine the pressure Pobs that there ought to be for the observed static flow rate Qobs, namely the pressure Pobs reflective of the observed flow rate Qobs via the characteristic C, namely Pobs=135 MPa. So, for a reference pressure Pref=120 MPa, there is a difference Pref-Pobs of −15 MPa. This difference is added to the reference pressure Pref to obtain the corrected pressure Pcor, namely Pcor=Pref+(Pref-Pobs)=2.Pref-Pobs=105 MPa.

According to another, theoretical, method, the corrected pressure Pcor is determined by using the Bernoulli equation. The Bernoulli equation can be written $$Q = \rho(P, T) \cdot A \cdot \sqrt{\frac{2 \cdot (P - Pcyl)}{\rho(P, T)}},$$

where Q is the static flow rate of the injector, $\rho$ is the density of the injected fluid, T is the temperature of the injected fluid, A is the working cross section of the injector, P is the (upstream) pressure of the common rail and Pcyl is the (downstream) pressure in the cylinder. For a reference injector, the reference static flow rate Qref is defined by $$Qref = \rho(Pref, T) \cdot Aref \cdot \sqrt{\frac{2 \cdot (Pref - Pcyl)}{\rho(Pref, T)}}.$$

For an injector exhibiting a drift in static flow rate Qobs, the desire is, by means of the invention, to keep the static flow rate the same as that Qref of the reference injector. So, the following relationship $$Qref = \rho(Pref, T) \cdot Aref \cdot \sqrt{\frac{2 \cdot (Pref - Pcyl)}{\rho(Pref, T)}}$$

still holds, where Aref is the reference working cross section corresponding to a new injector and Aobs is the current working cross section, as observed. In addition, the following ratios are equal:

$$\frac{Aobs}{Aref} = \frac{Qobs}{Qref} = R.$$

Simplifying, using certain simplifying assumptions, results in the shorter formula $$Pcor = \frac{\rho(Pref, T) \cdot (Pref - Pcyl)}{\rho(Pcor, T) \cdot R^2} + Pcyl$$

where Pcor is the corrected pressure, $\rho$ is the density of the injected fluid, Pref is the reference pressure, T is the temperature of the injected fluid, Pcyl is the pressure in the cylinder and R is the ratio of the observed static flow rate Qobs to the reference static flow rate Qref.

Figure 4:
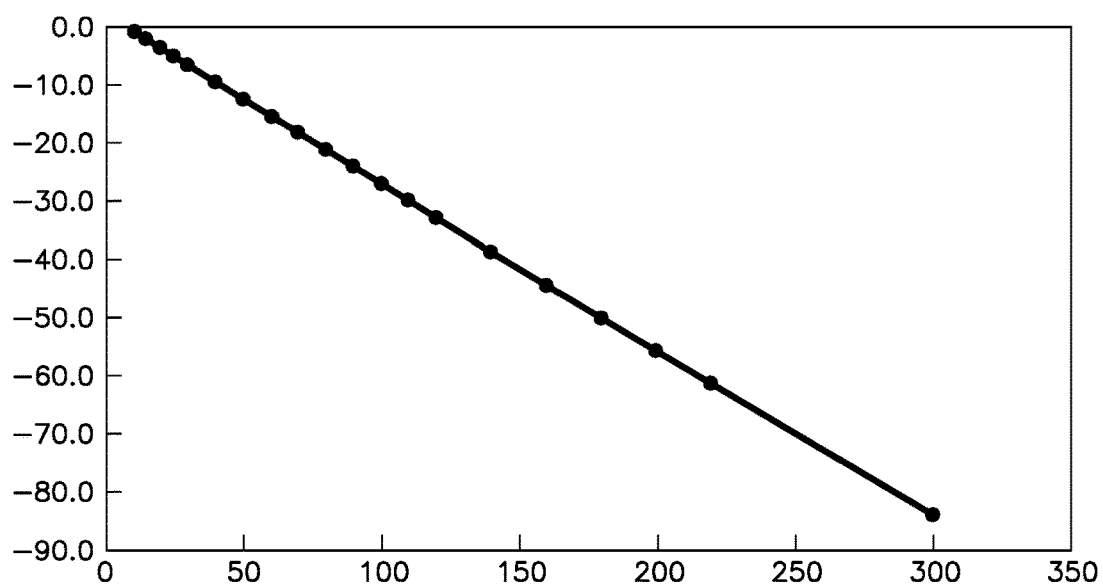
FIG. 4 depicts a corrective curve featuring the pressure correction to be applied in order to determine the corrected rail pressure on the ordinate axis as a function of the reference pressure on the abscissa axis for given wear and a given cylinder pressure.

Whatever method is adopted, be it an empirical, theoretical or some other method, it is possible to determine the corrected pressure Pcor as a function of the reference pressure Pref initially determined. For a given increase dQ in static flow rate and a given cylinder pressure Pcyl, this can be represented by a curve like that of FIG. 4 which features on the ordinate axis the pressure correction Pcor-Pref that is to be applied, as a function of the reference pressure Pref on the abscissa axis. Such a function may also be tabulated for later use. The curve in FIG. 4 is indicative of wear leading to a 20% increase in the static flow rate, namely a ratio R=1.2.

According to another feature, the method may further comprise a step of saturating the corrected pressure Pcor with a lower threshold Pmin. Thus, as illustrated in FIG. 2, the method in step E4 compares the corrected pressure Pcor as determined by one of the preceding methods, with a minimum pressure threshold Pmin. If the corrected pressure Pcor is below the lower threshold Pmin, the corrected pressure Pcor is taken to be equal to the threshold Pmin. Thus, as illustrated in FIG. 2, if the corrected pressure Pcor is below the lower threshold Pmin, the pressure Pmin is used, in step E7 as the setpoint for the feedback control of the common rail pressure. This saturating of the corrected pressure Pcor by a minimum pressure Pmin is justified by the fact that the common rail cannot perform its function correctly below the minimum pressure Pmin.

Because changing the common rail pressure to the corrected value Pcor corrects the static flow rate of the injector, the injection duration Tref needs to be kept the same in order to inject the same mass Mref of fluid. This can be applied in all cases, as shown by FIG. 2, in which, in all cases E5, E6 and E7 the setpoint mass Mref of fluid to be injected, which determines the injection duration, remains identical to that initially determined in step E1.

This advantageously makes it possible to maintain the same injection profile: same amplitude Qref, same duration Tref.

Figure 5:
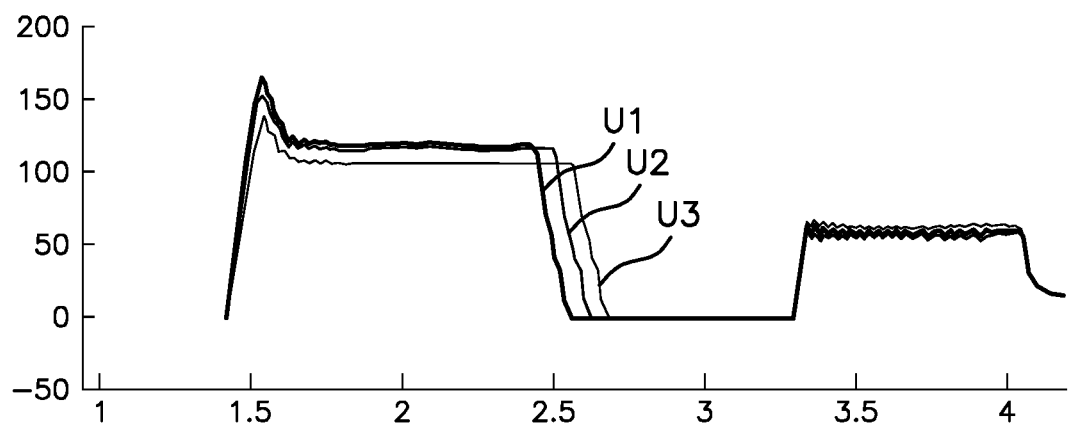
FIG. 5 is a comparative representation of three curves of control voltage as a function of time.

FIG. 5 shows the injector control voltage comparatively, as a function of time. U1 corresponds to the reference injector. U2 corresponds to an injector having a 20% increase in static flow rate, without correction. U3 corresponds to the same injector having a 20% increase in static flow rate, with correction of the common rail pressure.

Figure 6:
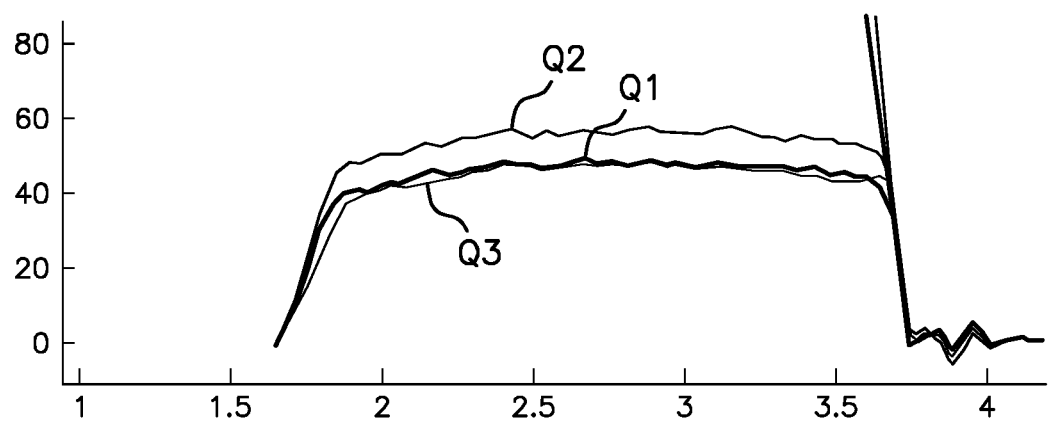
FIG. 6 is a comparative representation, on the same time scale as FIG. 5 of three corresponding curves of flow rate as a function of time.

FIG. 6 shows the resultant instantaneous flow rate comparatively, as a function of time, and in comparison with the curves of FIG. 5. Q1 corresponds to the reference injector. Q2 corresponds to an injector having a 20% increase in static flow rate, without correction. Q3 corresponds to the same injector having a 20% increase in static flow rate, with correction of the common rail pressure. It may be seen that the corrected profile Q3 substantially reproduces the reference profile Q1, both in terms of amplitude and in terms of duration. Here, for example, the correction results in a change from a reference pressure Pref of 220 MPa to a corrected pressure Pcor of 158 MPa.

Another embodiment may also be applied in the special case of saturation corresponding to the step E7. Specifically because of the saturation, the static flow rate is not fully corrected. In such a case, it is possible to modify the injection duration, so as to make an additional correction for the missing bit. This correction to the injection duration is performed using any method, such as the methods mentioned as part of the prior art. It should be noted that this correction applies only to the correction that is missing as a result of the saturation. So, the disadvantages mentioned with reference to the prior art are correspondingly limited as a result.

The invention is described above by way of an example. It is understood that a person skilled in the art is able to produce different variant embodiments of the invention, for example by combining the various features above taken alone or in combination, without departing from the scope of the invention in doing so.

The invention claimed is:

1. A method implemented by a controller that controls a common rail system for an internal combustion engine, comprising:
 injecting a predetermined quantity of fluid through an injector of the common rail system, the predetermined quantity of fluid being injected at a reference rail pressure and having a predetermined mass, and being injected for a predetermined duration of time;
 determining an instant static flow rate, as an observed static flow rate, of the predetermined mass of fluid injected through the injector;
 determining whether the observed static flow rate is greater than a reference static flow rate for the injector; and
 when the observed static flow rate is determined to be greater than the reference static flow rate,
  determining a corrected rail pressure for causing the rail system to inject said predetermined mass of the fluid through the injector with the observed static flow rate and with said predetermined duration of time, and
  controlling the rail system to inject another quantity of the fluid, having a mass equal to the predetermined mass, through the injector at the corrected rail pressure, the injector controlled to be open for injecting the fluid for a duration equal to the predetermined duration of time, where the corrected rail pressure is determined by computing a difference between the reference pressure and a predetermined pressure value that corresponds to the observed static flow rate for the injector, and adding said difference to the reference value.

2. The method as claimed in claim 1, further comprising: saturating the corrected rail pressure with a lower threshold.

3. The method as claimed in claim 1, wherein the reference static flow rate is a static flow rate correspondent to a flow rate of the injector when the injector is new.

4. The method as claimed in claim 1, wherein the instant static flow rate is determined by operation of a flow sensor of the rail system.

5. The method as claimed in claim 1, wherein, in an event where the determined corrected rail pressure is less than a predetermined minimum rail pressure for the injector, the corrected rail pressure to be used for controlling the rail system is further modified to be equal to the predetermined minimum rail pressure.

6. The method as claimed in claim 1, wherein the rail system is controlled by controlling a hydraulic pump of the rail system to change from the reference rail pressure to the corrected rail pressure.

7. The method as claimed in claim 6, wherein the instant static flow rate is determined by operation of a flow sensor of the rail system.

8. A method implemented by a controller that controls a common rail system for an internal combustion engine, comprising:
   injecting a predetermined quantity of fluid through an injector of the common rail system, the predetermined quantity of fluid being injected at a reference rail pressure and having a predetermined mass, and being injected for a predetermined duration of time;
   determining an instant static flow rate, as an observed static flow rate, of the predetermined mass of fluid injected through the injector;
   determining whether the observed static flow rate is greater than a reference static flow rate for the injector; and
   when the observed static flow rate is determined to be greater than the reference static flow rate,
   determining a corrected rail pressure for causing the rail system to inject said predetermined mass of the fluid through the injector with the observed static flow rate and with said predetermined duration of time, and
   controlling the rail system to inject another quantity of the fluid, having a mass equal to the predetermined mass, through the injector at the corrected rail pressure, the injector controlled to be open for injecting the fluid for a duration equal to the predetermined duration of time,
   where the corrected pressure is determined according to $$Pcor = \frac{\rho(Pref, T) \cdot (Pref - Pcyl)}{\rho(Pcor, T) \cdot R^2} + Pcyl$$

where Pcor is the corrected rail pressure, $\rho$ is a density of the injected fluid, Pref is the reference pressure, T is a temperature of the injected fluid, Pcyl is a pressure in the cylinder, and R is a ratio of the observed static flow rate to the reference static flow rate.

9. The method as claimed in claim 8, further comprising: saturating the corrected rail pressure with a lower threshold.

10. The method as claimed in claim 8, wherein the instant static flow rate is determined by operation of a flow sensor of the rail system.

11. The method as claimed in claim 8, wherein, in an event where the determined corrected rail pressure is less than a predetermined minimum rail pressure for the injector, the corrected rail pressure to be used for controlling the rail system is further modified to be equal to the predetermined minimum rail pressure.

12. The method as claimed in claim 8, wherein the rail system is controlled by controlling a hydraulic pump of the rail system to change from the reference rail pressure to the corrected rail pressure.

13. The method as claimed in claim 12, wherein the instant static flow rate is determined by operation of a flow sensor of the rail system.

* * * * *